US011182380B2

(12) United States Patent
Destefanis et al.

(10) Patent No.: US 11,182,380 B2
(45) Date of Patent: Nov. 23, 2021

(54) FLOW CONTROL FOR PROBABILISTIC RELAY IN A BLOCKCHAIN NETWORK

(71) Applicant: nChain Licensing AG, Zug (CH)

(72) Inventors: Giuseppe Destefanis, London (GB); Simone Madeo, London (GB); Patrick Motylinski, London (GB); Stephane Vincent, Luxembourg (LU); Alexandra Covaci, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 16/627,722

(22) PCT Filed: Jun. 25, 2018

(86) PCT No.: PCT/IB2018/054669
§ 371 (c)(1),
(2) Date: Dec. 30, 2019

(87) PCT Pub. No.: WO2019/003083
PCT Pub. Date: Jan. 3, 2019

(65) Prior Publication Data
US 2021/0160309 A1    May 27, 2021

(30) Foreign Application Priority Data

Jun. 30, 2017    (GB) .................................... 1710517
Aug. 21, 2017    (GB) .................................... 1713363

(51) Int. Cl.
*H04L 29/08*    (2006.01)
*G06F 16/23*    (2019.01)
(Continued)

(52) U.S. Cl.
CPC ........ *G06F 16/2379* (2019.01); *H04L 9/0643* (2013.01); *H04L 9/3093* (2013.01);
(Continued)

(58) Field of Classification Search
CPC ............................ H04L 67/104; H04L 9/0643
(Continued)

(56) References Cited

U.S. PATENT DOCUMENTS 6,487,194 B1    11/2002    Kirkby
7,644,150 B1    1/2010    Nucci et al.
(Continued)

FOREIGN PATENT DOCUMENTS

CN    104994019 A    10/2015
CN    106603633 A    4/2017
(Continued)

OTHER PUBLICATIONS

Liang et al., "DagStream: Locality Aware and Failure Resilient Peer-to-Peer Streaming," Multimedia Computing and Networking 2006 6071:60710L, Jan. 16, 2006, 15 pages. (Year: 2006).*
(Continued)

*Primary Examiner* — Glenford J Madamba
(74) *Attorney, Agent, or Firm* — Davis Wright Tremaine LLP

(57) ABSTRACT

The invention relates to method for adjusting the minimum and maximum number of peer nodes that a node on the blockchain network will connect with. The adjustment takes in to account the bandwidth and processing capability of the node. Bandwidth capacity of a node is determined based on a maximum data amount processable by the node over a time period. Data is monitored passing through interfaces of the node, to and from peer nodes, and a profile factor of the node is determined from the difference between the input data to output data. Over a plurality of time periods monitoring said data the data analysed is used to set a minimum number of peer nodes and a maximum number of peer nodes connectable to the node according to said monitored data and the maximum number of peers connectable to the node. The (Continued)

method enables a node to adjust the number of connections according to performance limitation factors, such as bandwidth availability and processing performance. With the number of peer node connections determined, the node can further determine a correlation matrix between the interfaces and peer nodes to which it is connected. The matrix can be compiled with correlation coefficients representing the correlation between data processed at each interface of said node. The invention also resides in a corresponding computer readable storage medium, electronic device, node of a blockchain network or blockchain network having such a node.

15 Claims, 2 Drawing Sheets

(51) Int. Cl.
  *H04L 9/06*      (2006.01)
  *H04L 9/30*      (2006.01)
(52) U.S. Cl.
  CPC ............ *H04L 67/10* (2013.01); *H04L 67/104* (2013.01); *H04L 2209/38* (2013.01)
(58) Field of Classification Search
  USPC ........................................................ 709/231
  See application file for complete search history.

(56) References Cited

U.S. PATENT DOCUMENTS

| | | |
|---|---|---|
| 8,352,585 B2 | 1/2013 | Hu et al. |
| 2004/0233849 A1 | 11/2004 | Cole |
| 2005/0080858 A1 | 4/2005 | Pessach |
| 2005/0083848 A1 | 4/2005 | Shao et al. |
| 2005/0097386 A1 | 5/2005 | Datta et al. |
| 2005/0144544 A1 | 6/2005 | Gariador et al. |
| 2006/0224748 A1 | 10/2006 | Gupta et al. |
| 2006/0265371 A1 | 11/2006 | Edmond et al. |
| 2008/0016115 A1 | 1/2008 | Bahl et al. |
| 2008/0267083 A1 | 10/2008 | MacCormick et al. |
| 2009/0138592 A1 | 5/2009 | Overcash et al. |
| 2009/0175172 A1 | 7/2009 | Prytz et al. |
| 2010/0185760 A1 | 7/2010 | Nakahira |
| 2013/0031211 A1 | 1/2013 | Johnson et al. |
| 2013/0259043 A1 | 10/2013 | Yamashita |
| 2014/0195656 A1 | 7/2014 | Hopkins |
| 2014/0317196 A1 | 10/2014 | Maenpaa |
| 2015/0049759 A1 | 2/2015 | Noyama et al. |
| 2017/0171222 A1 | 6/2017 | Ling et al. |
| 2019/0018887 A1* | 1/2019 | Madisetti .............. H04L 9/3247 |
| 2020/0059369 A1* | 2/2020 | Li ......................... H04L 9/3297 |

FOREIGN PATENT DOCUMENTS

| | | |
|---|---|---|
| EP | 2031800 A1 | 3/2009 |
| EP | 2432164 A1 | 3/2012 |
| EP | 2464060 A1 | 6/2012 |
| EP | 1690398 B1 | 5/2015 |
| JP | 2009049458 A | 3/2009 |
| WO | 9963708 A2 | 12/1999 |
| WO | 2004110024 A1 | 12/2004 |
| WO | 2007127401 A2 | 11/2007 |

OTHER PUBLICATIONS

Al Hamra, "Swarming overlay construction strategies," Proceedings of the 18th International Conference on Computer Communications and Networks (ICCCN) 2009, Aug. 2009, 8 pages.
Anonymous, "Bitcoindeveloper Introduction," Bitcoin Developer, copyright 2009-2020, https://developer.bitcoin.org/reference/intro.html, 2 pages.
Decker et al., "Information propagation in the Bitcoin network," IEEE Thirteenth International Conference on Peer-to-Peer Computing (P2P), Sep. 9, 2013, 10 pages.
International Search Report and Written Opinion dated Jan. 3, 2019, Patent Application No. PCT/IB2018/054667, 15 pages.
International Search Report and Written Opinion dated Sep. 26, 2018, Patent Application No. PCT/IB2018/054669, 15 pages.
Liang et al., "DagStream: Locality Aware and Failure Resilient Peer-to-Peer Streaming," Multimedia Computing and Networking 2006 6071:60710L, Jan. 16, 2006, 15 pages.
Lu et al., "Content-based peer-to-peer network overlay for full-text federated search," Large Scale Semantic Access to Content (Text, Image, Video, and Sound), May 30, 2007, 20 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
Small et al., "Scaling Laws and Tradeoffs in Peer-to-Peer Live Multimedia Streaming," Proceedings of the 14th ACM International Conference on Multimedia, Oct. 2006, 10 pages.
UK Commercial Search Report dated Jan. 12, 2018, Patent Application No. GB1713363.8, 7 pages.
UK IPO Search Report dated Jan. 15, 2018, Patent Application No. GB1713363.8, 5 pages.
Zookolaptop et al., "Bitcoin Wizards chat log Oct. 30, 2015," IRC Log, Oct. 30, 2015, https://irclog.whitequark.org/bitcoin-wizards/2015-12-30, 41 pages.

* cited by examiner

FLOW CONTROL FOR PROBABILISTIC RELAY IN A BLOCKCHAIN NETWORK

FIELD OF INVENTION

This specification relates generally to computer-implemented methods and systems suitable for implementation in nodes of a blockchain network. Modified blockchain node structures, network architectures, and protocols for handling large numbers of transactions and large transaction blocks are described. The invention is particularly suited, but not limited, to use with the Bitcoin blockchain.

BACKGROUND OF INVENTION

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

According to Blochain.info [1], in April 2017 the average number of Bitcoin transactions per block was around 2000 units. In the near future, the constraints on the maximum block size may be relaxed and the number of transactions per block may increase significantly.

A competitive cryptocurrency needs to propagate as fast as possible a high volume of unconfirmed transactions. By way of comparison, Visa electronic funds transfer has a peak capacity of 56 k transactions per second [2].

The current three-step messaging protocol for the exchange of new transactions in the Bitcoin network by means of inventories is not sufficient to cope with the fast dissemination of a volume of transactions several orders of magnitude larger than the current standard (~5 transactions per second [3]).

Today's Bitcoin network is heavily centred around mining, in terms of computational effort. With vastly increased volumes of transactions this is not necessarily going to be feasible.

Not only is the management of data flow essential, but the technical capacity or ability of the nodes and the network need to be taken in to account.

The solution described in this specification enables the Bitcoin network to handle the propagation of massive amount of transactions, while taking in to account the limitations of nodes and networks.

Known methods of sending data packets or transactions across the Bitcoin network e.g. dissemination of new transactions by means of a 3-steps messaging, result in slow propagation and dissemination of data packets across the network. The preliminary steps lead to queues in to and out of nodes. These problems are exacerbated when a node is required to operate over or around its nominal limits.

SUMMARY OF INVENTION

Overall, the invention resides in a novel approach for the handling and propagation of increased amounts of transactions several orders of magnitude larger current blockchain capabilities. This can be achieved by supporting faster propagation and dissemination of data packets across the network by reducing the communications between nodes. Long queues in to, and out of, nodes caused by bottlenecks are inhibited by selectively relaying data packets according to the correlation between interfaces. Additionally or alternatively, the invention resides in a novel approach to manage the data or traffic passing through a node's interfaces to peer nodes. This can take into account the data to be transferred and the local resources. Said local resources can include at least one of the bandwidth resource, data profile, the number of connected peers and the performance of the node. The function of the node can also be taken in to account.

The method enables a node to behave in an adaptive manner such that it is (i) agnostic to the number of interfaces connected to peer nodes, and (ii) agnostic to changes associated with the interfaces of a node, such that new connections, broken connections and malicious nodes are accounted for—and the integrity of the network is maintained.

The method allows for a limitless number of interfaces on a node that can be managed, this the performance and size of the network is limitless because the method adapts to the network and nodes' circumstances. Inefficient transmissions are minimised and malicious nodes are circumvented.

The method allows for a minimum and maximum number of connected peers to be determined. The time windows for performing key tasks can be adjusted accordingly.

The method enables improved blockchain network performance and provides an improved blockchain network, or overlay network that cooperates with a blockchain network.

Thus, in accordance with the present invention there is provided a method as defined in the appended claims.

Thus, it is desirable to provide a computer-implemented method for a node of a blockchain network, said node having a plurality of interfaces connected to peer nodes, the computer-implemented method comprising: determining a bandwidth capacity of a node based on a maximum data amount processable by the node over a time period; monitoring the data, comprising input data and output data, passing through interfaces of the node, to and from peer nodes, and determining a profile factor of the node from the difference between the input data to output data; over a plurality of time periods monitoring said data; and setting a minimum number of peer nodes and a maximum number of peer nodes connectable to the node according to said monitored data and the maximum number of peers connectable to the node.

The method enables a node to adjust the number of connections according to performance limitation factors, such as bandwidth availability and processing performance.

Over at least one time period the monitored data can be used to determine a ratio. Setting the minimum number of peer nodes and a maximum number of peer nodes connectable to the node can be determined using said ratio. The ratio can be calculated from the data passing through the nodes and the maximum amount of data processable by the node. The ratio can be non-linear.

The profile factor can be is assigned a value according to the function of the node, wherein the profile factor has a value of one (1) for nodes configured to route data, a value greater than one (1) for nodes that collect or aggregate data, and a value less than one (1) for nodes that generate or provide data.

The node can have a plurality of interfaces connected to peer nodes and a correlation matrix can be determined from correlation coefficients representing the correlation between data processed at each interface of said node. The time period can be determined from the length of time between changes to the correlation matrix. The change can be related to node initiation or boot-up or related to nodes joining or leaving the network.

The node can receive information related to the activity of nodes on the blockchain network and determines the time period according to the length of time between changes to the correlation matrix.

The averaged data, comprising an average of data over the plurality of time periods, can be used to determine the minimum and maximum number of peer nodes connectable to the node by determining the ratio of averaged data to the maximum data.

The method can further include determining a variance of the data over a plurality of time periods, applying a scaling factor to the variance, and determining the minimum and maximum number of peer nodes connectable to the node according to the scaled variance.

The minimum and maximum number of peer node connections (m) can be determined from $$m_{min} = \left[\frac{d^*}{D}P - t\sigma^2\right]$$

$$m_{max} = \left[\frac{d^*}{D} \cdot P + t\sigma^2\right]$$

wherein d* is the averaged level of data (d) over the plurality of time periods (T), D is the maximum data (D) processable by the node over a time period (T), P is the maximum number of peers (P) connectable to the node, $\sigma^2$ is the variance of said data (d), t is a scaling factor or variance parameter, and $m_{max} \leq P$ The scaling factor or variance parameter t can be defined by $$\frac{\frac{d_j^*}{D_j}P - 1}{\sigma_j^2} \leq t \leq = \frac{P\left(1 - \frac{d_j^*}{D_j}\right)}{\sigma_j^2}$$

and the mean value of t can be used when determining the minimum and maximum number of peer nodes connectable to the node.

The time period can be adjusted by the node to a predetermined value temporarily to accommodate at least one of a local parameter update to the node, an initiation period, wherein the node accumulates data, and temporary relay of data to all peer nodes.

The time period can be a flow control parameter. The parameter can be adjusted to modify the traffic passing through the node.

With the number of peer node connections determined, the node can further determine a correlation matrix between the interfaces and peer nodes to which it is connected. The matrix can be compiled with correlation coefficients representing the correlation between data processed at each interface of said node.

When the node has a plurality of interfaces connected to peer nodes, said plurality being at least a minimum number of interfaces connected to a peer node ($m_{min}$) and less than or equal to a maximum number of interfaces connected to a peer node ($m_{max}$), the method can further comprise: determining a correlation matrix having correlation coefficients representing the correlation between data processed at each interface of said node; receiving data at a receiving interface of said node; selecting at least one of a plurality of other interfaces of said node, and relaying said received data from the or each other interface, wherein other interfaces are selected according to a set of the correlation coefficients of the receiving interface.

The indicator can be derived from the correlation matrix. Data can be relayed if the correlation between the receiving interface and the or each other interface is lower than the indicator.

The data can correspond to an object such as a transaction or a block. Relay can alternatively occur if the correlation is higher than the indicator. The indicator can be a threshold. The indicator can represent a level, such as average value, of correlation between an interface receiving data and a plurality of interfaces. The average value can be the average of the correlation coefficients between the receiving interface and the other interfaces. The indicator can be used to determine a metric, said metric setting criteria for selecting which of the other interfaces are selected to relay data. The metric can be considered as instructions that are used to select which interfaces data is to be relayed from. The instructions can be set according to, or be dependent upon, the threshold or indicator.

The instructions, by way of example, require that the interfaces have a correlation index beneath the indicator. The instructions can determine which of the interfaces relays data according to whether the correlation index is above or below the indicator.

An example of data relay when the index is below the indicator can be normal steady-state network conditions. In a 'steady-state' condition the number of interfaces and connected peers remains unchanged, such that the correlation matrix is unchanged.

An example of data relay when the index is above the indicator can be changing conditions, such as the addition of new peer node connections to the node. Different instructions can apply to different interfaces.

The data distributed can include data received from a blockchain network, including data from miners, peer nodes and full nodes. The correlation between the data processed at each interface of the node can account for duplicates data packets or objects received at a node. The indicator can be an average or median value of the correlation indexes of each interface of a node. The indicator can define a point between lowest and highest correlated interfaces. Data or objects can be relayed from the interface when a correlation index according is beneath the indicator. Interfaces with low levels of correlation can be prioritised because it can be safely assumed that those with high correlation will get the data.

A node processes data via an interface, said processing encompassing sending and receiving data or objects, such as transactions or blocks.

The data can reside in network packets representing a serialised transaction and an Identification representing the connection to an adjacent or peer node. The interface can be a logical interface ID representing the TCP/IP connection to the sending/receiving peer.

The node can establish the correlation matrix by monitoring (i) the data Identifiers of each packet of data processed through each interface and (ii) Identical transactions processed through pairs of interfaces, and determines a correlation coefficient between any two interfaces therefrom. The correlation matrix can have m(m−1) elements and can be used to determine a correlation index of an interface a, as follows:

$$c_a = \sum_{i=0}^{a-1} c_{ia} + \sum_{i=a+1}^{m-1} c_{ai}$$

wherein m is the number of interfaces connected to peer nodes.

The correlation matrix can have m(m−1) elements and can be used to determine a set of correlation coefficients for an interface a as follows:

$$\{C_a\} = [c_{0a}, c_{1a}, \ldots, c_{am-1}].$$

The indicator can be determined by: determining a set of correlation coefficients, derived from the correlation matrix, for each interface connected to a peer node, said set having the connection coefficients between each interface; and deriving an average or median value from said set.

The indicator can be used by a set of instructions to determine which interfaces relay data.

The indicator for determining the number of interfaces relaying data can be further based on at least one of: a reset time, being the time since node initiation or start-up; and a change time, being the time between change events including at least one of: a new peer node connecting to an interface; a terminated connection to an interface; and an interface connecting to a malicious node. The reset time can be used for new nodes. The change time can be used for existing nodes.

Upon node initiation the node can connect with peer nodes, such as those adjacent or directly connected to said node, and relay data via all interfaces for the reset time period, during which the correlation matrix is established, and after said period of time has passed the node relays all objects from the node via interfaces having a correlation index beneath the indicator.

Upon detecting a change event the correlation matrix can be reset and re-determined. This can occur when a periodical reset is required.

The invention also resides in a computer readable storage medium comprising computer-executable instructions which, when executed, configure a processor to perform the methods as claimed.

The invention also resides in an electronic device comprising: an interface device; one or more processor(s) coupled to the interface device; a memory coupled to the one or more processor(s), the memory having stored thereon computer executable instructions which, when executed, configure the one or more processor(s) to perform the method as claimed.

The invention also resides in a node of a blockchain network, the node configured to perform the method as claimed. The invention also resides in a blockchain network having a node as claimed.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
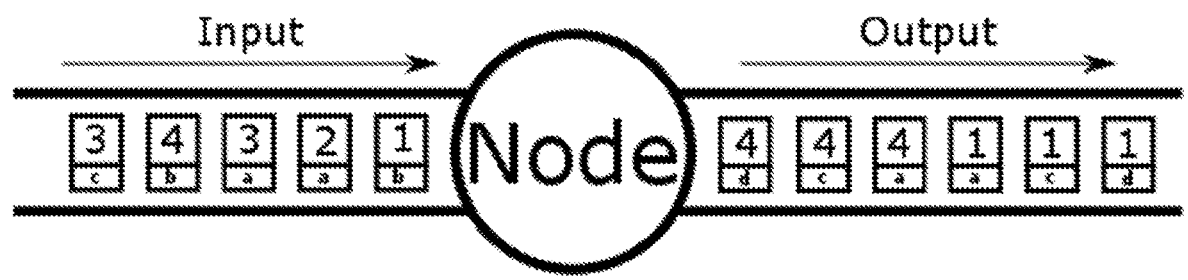
FIG. 1 illustrates network packets serially sent and received at application-level via a node on a bitcoin network.

In this specification a solution to the problem of processing and storing large Gigabyte-sized blocks is described. Efficient transaction of data across a blockchain network can be improved by determining the connectivity between nodes and relaying data accordingly. Moreover, the specifications of the nodes and bandwidth available influence the flow of data across the network and number of connections a node has and the time periods for determination of connectivity can be adjusted or dimensioned to improve flow.

Processing

Types of Blockchain Network Nodes & Validation Nodes

A blockchain network may be described as a peer-to-peer open membership network which may be joined by anyone, without invitation or without consent from other members. Distributed electronic devices running an instance of the blockchain protocol under which the blockchain network operates may participate in the blockchain network. Such distributed electronic devices may be referred to as nodes. The blockchain protocol may be a Bitcoin protocol, or other cryptocurrency, for example.

Some blockchain networks, such as Bitcoin, use TCP for node-to-node communications. Data packets sent using TCP have an associated sequence number which is used for ordering purposes.

In addition to this, the TCP protocol involves a three-way handshake procedure, both when establishing a connection as well as terminating one. Packets sent over TCP come with an overhead associated, they have a sequence number associated and there is a three-way handshake protocol. In establishing a connection 128-136 bytes are being transmitted, whereas closing a connection costs 160 bytes. Thus the handshake in packet transmission costs up to 296 bytes.

Additionally, when a node receives a new transaction, it notifies the other nodes with an inventory (INV) message which contains the hash of the transaction. A node which receives an INV message checks whether the hash of that transaction has been seen before; if not, the node will request the transaction by sending a GETDATA message. The time necessary to transmit a transaction from Node A to Node B is T1=verification+TCP(inv+getdata+tx), where TCP( ) indicates the overhead, in terms of time, introduced by the TCP handshake procedure.

The TCP Protocol and the Three-Way Handshake

The current peer-to-peer Bitcoin protocol defines 10 data messages and 13 control messages. In this context, the transfer of data, or data packets, relates to object transfer may refer to individual transactions or blocks.

A complete list of the messages used by the Bitcoin P2P protocol is known—please refer to [4] for the complete list. A sub-group of messages are related to the request or distribution of objects. These messages are BLOCK, GETDATA, INV, TX, MEMPOOL and NOTFOUND. A sub-group of messages are related to the reliability and efficiency of objects. These messages are FEEFILTER, PING, PONG and REJECT.

By way of example, nodes 'i' and 'j' on the Bitcoin network communicate using the following steps:
1. Node i transmits an INV message containing a list of transactions.
2. Node j replies with a GETDATA message asking for a subset of the transactions previously announced.
3. Node i transmits the requested transactions.

The method herein seeks to optimise the protocol of a blockchain network to improve, at least, the dissemination of data.

FIG. 1 illustrates the real scenario where data, in the form of network packets, is serially sent and received at application-level according to the primitives provided by the operating system. Assuming that a transaction x fits in a single Ethernet/IP packet, its transmission to m peers requires the buffering of m different output packets. Both input and output network packets, along with other information, will contain:

A serialized transaction.

A logical interface ID representing the TCP/IP connection to the sending/receiving peer.

The expected time for an incoming transaction to be processed depends on the average length (in packets) of the input queue $L^i$, while the expected time for a processed transaction to be correctly transmitted depends on the average length of the output queue $L^o$.

Therefore, the efficient relay of transactions relies on the reduction of both $L^i$ and $L^o$ values. However, a probabilistic model for selective relay of the transactions to the peers directly affects $L^o$ and by induction also $L^i$.

In the current Bitcoin implementation, INV and GETDATA message packets are queued in the I/O buffers in the same way as transactions, with a severe impact on the transmission and reception delays.

Connectivity—Efficient Transactions Propagation—Probabilistic Relay

If node i was allowed to directly transmit new transactions without the use of inventory exchanges, the transactions would be disseminated in the network at a faster rate. Without some sort of regulation, however, the network would be flooded.

The method herein, therefore, uses a mechanism for the selective relay of data or objects from a node to a peer node to avoid the transmission of a huge amount of unnecessary transactions. The mechanism can be a probabilistic model.

Figure 2:
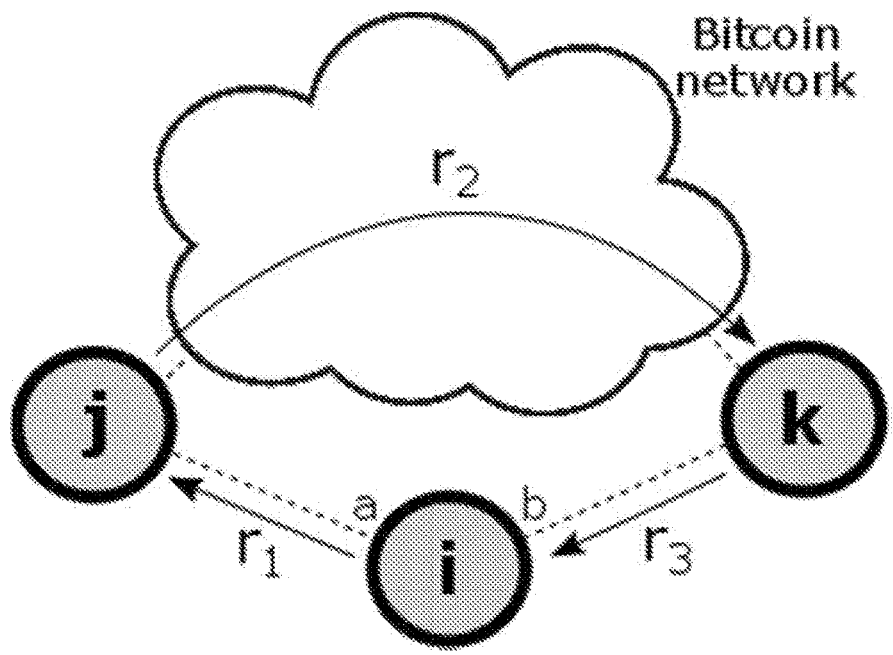
FIG. 2 represents the route taken by a single transaction between nodes and across the bitcoin network.

The mechanism, or probabilistic model, for transaction relay is based on assumptions, with reference to FIG. 2 in which three nodes i, j and k are part of a Bitcoin network and connected together. Node i is directly connected to Node j and Node k. Nodes j and k are indirectly connected via Node i or via the Bitcoin network.

Node i is shown having two interfaces a and b that process data in the form of a transaction r, which is initiated at Node i and experiences various stages as it is propagated between nodes and across the Bitcoin network, said stages including:
 a first stage $r_1$ processes the transaction for transmission from interface a, to a peer node and is received at Node j,
 a second stage $r_2$ Node j processes the transaction for transmission across the Bitcoin network is received at Node k, and
 a third stage $r_3$ Node k processes the transaction for transmission to peer Node I, which receives the transaction at interface b.

For the avoidance of doubt, $r_1$, $r_2$ and $r_3$ are the same transaction and the suffixes represent a relay.

The assumptions below are made:
 If a node receives from an interface (b) the same transaction which was processed for transmission from another interface (a), then the two interfaces share a degree of correlation.
 If a transaction generated at node i reaches node j through a given j's input interface, then a second transaction generated at node i will reach j through the same interface with high probability.

Referring again to FIG. 2, as an example of relay correlation, Nodes j and k are peers of Node i. If i generates a new transaction and relays it to node j, and later the same transactions is received at Node i from Node k, then j and k share a logical path through the network. Therefore, the originating node does not need to relay the same information to both its peer nodes. To be clear, Node i does not need to transmit transaction r to Node k because the probability of Node k receiving said transaction is high. Similarly, in reverse, Node k does not need to transmit transaction r to Node i because the probability of receiving said transaction is high. The logic is valid in both directions.

Relationships Between Interfaces of a Node

Figure 3:
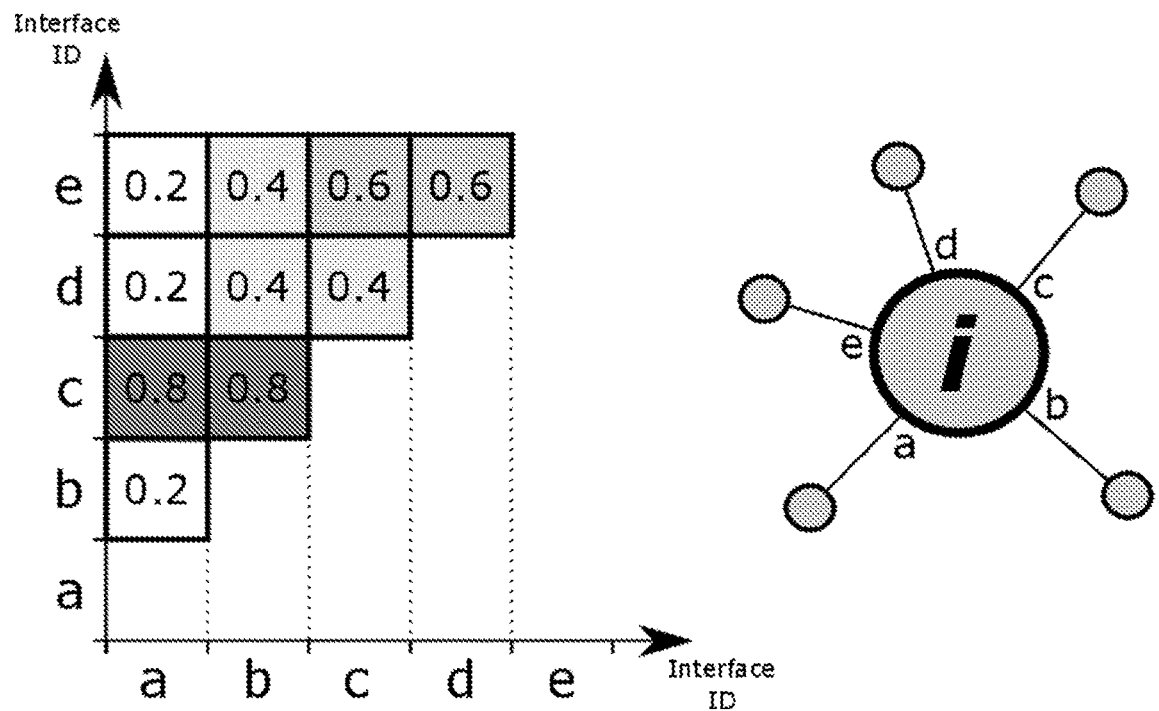
FIG. 3 is an illustration of a correlation matrix showing the correlation coefficients of the interfaces connected to peer nodes.

FIG. 3 is an example of a local correlation matrix C that can be determined for a Node i having five interfaces—a, b, c, d and e—connected to peer nodes. The matrix represents the degree of correlation for the incoming traffic. The formation and application of said matrix is described below. The values shown in FIG. 3 are for illustration purposes.

Each node establishes a correlation matrix C by determining, by way of example, coefficients $c_{ab}$ representing the correlation between the transactions received from interfaces a and b. Such a coefficient is determined between all pairs of the interfaces.

Using the list of transaction IDs received from each interface, let $t_a$ and $t_b$ be the number of transactions received from interfaces a and b respectively, and $t_{ab}$ be the number of duplicate transactions received from both a and b. The correlation coefficient for interfaces a and b is defined by Formula 1:

$$c_{ab} = \frac{t_{ab}}{\max\{t_a, t_b\}} \leq 1 \qquad \text{(Formula 1)}$$

As a convention, for a coefficient $c_{ab}$ we assume a lexicographical order a<b of its indexes i.e. a is assigned '0' (a=0), b is assigned '1' (b=1) and c is assigned '2' (c=2), and so on between interface IDs and numerical values. Given the correlation coefficients for a set of interfaces {a, b, d, e}, then interfaces a and b are more correlated than interfaces d and e if $c_{ab} > c_{de}$.

Since the elements on the main diagonal are not significant, the matrix size can be reduced to m(m−1) elements, as shown in FIG. 3.

Assigning a Value to a Node Interface

An overall correlation index of an interface a is defined in Formula 2, as follows:

$$c_a = \sum_{i=0}^{a-1} c_{ia} + \sum_{i=a+1}^{m-1} c_{ai} \qquad \text{(Formula 2)}$$

Using the correlation matrix in FIG. 3 as an example, the correlation index $c_a$ for interface a can be expressed as the sum of the correlation coefficients between each interface.

$$c_a = c_{ab} + c_{ac} + c_{ad} + c_{ae} = 0.2 + 0.8 + 0.2 + 0.2 = 1.4$$

This metric can be used to rank the correlation of the individual interfaces and understand the quality of relay provided by the node peers. By way of example, if the correlation index of a is significantly higher than the average value, then the transactions received from a are highly redundant.

Conversely, if a correlation index of a is significantly lower than the average value, then either (i) the transactions received from a are somewhat unique or (ii) the peer node connected to a is behaving maliciously. Malicious behaviour is discussed in more detail below.

It is to be noted that each node builds its own correlation matrix based only on the received transaction flows. No correlation information is exchanged between nodes or peers to avoid the propagation of malicious information.

Indicator

Given an incoming transaction from interface a, the node will perform the relay to a number of peers m* in the range $[m_{min}, m_{max}]$.

The current value m* depends on the current distribution of the m−1 correlation coefficients $\{c_a\}$ containing connection index a:

$$\{c_a\} = [c_{0a}, c_{1a}, \ldots c_{am-1}]$$

In other words, $\{c_a\}$ is the list, or set, of correlation coefficients—this set having the coefficients for interface a. The connection index is a summation of the coefficients, i.e. $c_a = c_{ab} + c_{ac} + c_{ad} + c_{ae}$, as per FIG. 3 and the example above.

The number of interfaces m*(a) selected for relay from interface a depends upon the computation of a metric $\theta_i^{(a)}$ for each element of the set $\{c_a\}$, wherein:

$$m^*(a) = \sum_{i=0}^{m-1} \theta_i^{(a)}$$

The metric $\theta_i^{(a)}$ functions as a switch, or selector, and indicates whether an interface will relay data, or not. For example, an interface will relay data if its metric is '1' and not relay data if its metric is '0'.

By defining $\overline{c_a}$ as the average value of the coefficients within the set $\{c_a\}$, the metric $\theta_i^{(a)}$ contributes to m*(a) if the corresponding correlation coefficient $c_{ai}$ is lower than $\overline{c_a}$:

$$\theta_i^{(a)} = \begin{cases} 1, & c_{ai} \leq \overline{c_a} \\ 0 & c_{ai} > \overline{c_a} \end{cases}$$

$\theta_i^{(a)}$ may alternatively be based on the median value of $\{c_a\}$ rather than the average value. The metric $\theta_i^{(a)}$ can also be based upon, or determined from, alternative values derived from the set $\{c_a\}$ using statistical analysis, e.g. the metric $\theta_i^{(a)}$ contributes to m*(a) if the corresponding correlation coefficient $c_{ai}$ is at least one standard deviation beneath the mean of the set $\{c_a\}$.

An incoming transaction, by way of example from interface a in FIG. 3, will be relayed to the m*(a) least correlated interfaces according to the correlation coefficients in $\{c_a\}$. A subset of $\{c_a\}$ selected for relay will be defined as $\{c^*_a\}$.

Returning to the example of FIG. 3, if $\{c_a\} = \{0.2, 0.8, 0.2, 0.2\}$, then,
$\overline{c_a} = 0.35$
$\theta_b^{(a)} = 1$
$\theta_c^{(a)} = 0$
$\theta_d^{(a)} = 1$
$\theta_e^{(a)} = 1$ Therefore, the number of interfaces m*(a) selected for relay from interface a is '3'. The coefficients in the subset falling below the average value, or indicator, which determine the metric $\theta_i^{(a)}$, are {0.2, 0.2, 0.2}, said coefficients corresponding to {c*a} and interfaces b, d, e, are selected for relay.

The 'cut-off' point, or level of coefficient that was used to determine the metric in the example above, was the average of the coefficients—'0.35'. This threshold, or indicator, determines the metric $\theta_i^{(a)}$ from which m*(a) is determined.

Overall, therefore, the method can be said to relay data from an interface according to an indicator. Said indicator can be used to determine a metric for each interface that determines whether it will relay data, or not.

While the indicator has been used to determine the metric in the example above, other factors can influence the metric for each interface. The metric for each interface can be calculated according to changes to the correlation matrix.

Accommodating Changes

The determination of which interfaces are to be used to relay information, as described above, assumes a steady-state condition in which the matrix is unchanged.

Further details of the protocol are now provided below for an explanation of how the protocol can accommodate change—for example when peer nodes join the network and make new connections with a node, or when peer nodes leave the network and are no longer connected to an interface of a node.

When accommodating change, data can be relayed based on the metric, which takes in to account the indicator and, ergo, the correlation index.

Start-Up

When a node i boots up, it initializes m peer connections with other nodes in the blockchain, such as the Bitcoin network. See, for example, the Bitcoin developer reference [4] for full details. At the initial stage, node i does not have any information about the correlation between data passing through its interfaces and has a limited set of data representing data passing or flowing therethrough. Therefore, full transaction relay will be performed for an amount of time.

During this period $T_{bootup}$ the metric $\theta_i^{(a)}$ contributes to m*(a) by setting each interface to '1' and relaying data from all interfaces. The metric, therefore, allows data to be relayed irrespective of the indicator for a period of time.

The length of period $T_{bootup}$ is a function $f(m)$ of m, i.e. a higher number of connections requires a longer amount of time to build an accurate correlation matrix. The following functions are proposed, by way of example only:

$$f_1(m):=m$$

$$f_2(m):=m^2$$

After $T_{bootup}$, node i performs the selective relay as per the existing nodes presented below.

Existing Nodes

The connections of a generic node j will vary with time in light of a change, such changes because of other nodes either (i) joining, (ii) leaving the network, and/or (iii) behaving maliciously, said malicious nodes selectively blacklisted and the corresponding connections closed.

Therefore, any change in the whole network graph, can be detected and parametrized by a quantity $T_{change}$ representing the average time between two (or more) consecutive change events. Once every $T_{change}$, node j's local correlation matrix needs to be updated.

Updates to the correlation matrix of a node can include at least one of:

A periodic reset, wherein the correlation matrix is reset.

As per new nodes, full transaction relay will be performed for an amount of time $T_{bootup}$. Then, node j performs the selective relay on its new m* values for each interface connected to a peer node.

An update, wherein the correlation matrix is updated.

For a given interface a, the β highest correlated interfaces, $0<\beta<m_{min}$, from the selected set $\{c^*_a\}$ will be swapped with the β least correlated interfaces not in $\{c^*_a\}$.

In other words, while data is relayed, normally, to the m*(a) least correlated interfaces in the subset $\{c^*_a\}$, when the matrix is updated interfaces that are not part of the subset $\{c^*_a\}$ and have low correlation indexes will be added to said subset in place of those having a high correlation index within said subset. This can ensure the integrity of the flow of data across the network in time of change.

Returning again to the example of FIG. 3, normally, $$c_d = c_{da} + c_{db} + c_{dc} + c_{de} = 0.2 + 0.4 + 0.4 + 0.6 = 1.6$$

$\{c_d\} = \{0.2, 0.4, 0.4, 0.6\}$

Taking $\overline{c_d}$ as the average value of the coefficients within the set $\{c_d\}$, the metric $\theta_i^{(d)}$ contributes to m*(d) if the corresponding correlation coefficient $c_{di}$ is lower than $\overline{c_d}$:

$$\theta_i^{(d)} = \begin{cases} 1, & c_{di} \leq \overline{c_d} \\ 0 & c_{di} > \overline{c_d} \end{cases}$$

Then, $\overline{c_d} = 0.4$
$\theta_a^{(d)} = 1$
$\theta_b^{(d)} = 1$
$\theta_c^{(d)} = 1$
$\theta_e^{(d)} = 0$ Normally, the number of interfaces m*(d) selected for relay from interface d is '3'. The coefficients in the subset falling below the average value, or indicator, which determine the metric $\theta_i^{(d)}$, are $\{0.2, 0.4, 0.4\}$, said coefficient corresponding to $\{c^*_d\}$ and interfaces a, b and c are selected for relay. For the avoidance of doubt, the coefficient corresponding to interface e i.e. $\{0.6\}$ is not within the selected subset $\{c^*_d\}$.

When an update occurs, in relation to interface d, it happens that there are two β highest correlated interfaces within the set $\{c^*_d\}$—these being interfaces b and c, both with values of 0.4.

There is only one interface that qualifies as the β least correlated interfaces not in $\{c^*_d\}$, said interface being e. Therefore, only one 'swap' can be made and the choice of which interface to swap with is either b or c, because both have the same coefficient of 0.4. By way of example, the selection of which interface is selected for a swap can be made according to the lexicographic priority. This interface is then swapped with the β least correlated interfaces not in $\{c^*_a\}$, which means the lowest coefficients will be selected from the remaining coefficients from the set, $\{c_d\} = \{0.4, 0.4, 0.6\}$. The lowest coefficients correspond to interfaces b and c, and, therefore data will be relayed to peer nodes connected to these interfaces rather than interface a.

If a peer disconnects, its coefficients in the correlation matrix will become invalid. At the end of the $T_{change}$ period, the above mentioned periodical reset is required. Then, node j performs the selective relay on its new m* values for each connection interface.

If a new peer b joins, the interface to which it is connected will be chosen for relay regardless of the current values of $\{c^*_a\}$ for each other peer interface with node a. By way of example, the interface with b can be randomly selected for relay every γ incoming transactions for an amount of time $T_{join}$.

$T_{join}$ is set according to $T_{bootup}$ and/or $T_{change}$ periods. This relay will help node b to build its own correlation matrix. At the end of $T_{join}$, b will be selected for relay according to the updated values $\{c^*_a\}$ for each other peer interface at node a only.

Node i may require to check if its peer j is still alive because no incoming traffic was received from its interface. A temporary relay request for an arbitrary small amount of time $T_{temp}$ can be sent to j.

Nodes who publish a new transaction, i.e. originating nodes, need to select the sets of selected peers for relay carefully to guarantee the dissemination in the network. For instance, a number of nodes m** for any interface a can be selected as first relay, with m*(a)<m**<m.

The whole list of parameters is detailed in Table 1, below.

TABLE 1

| Parameter | Description |
|---|---|
| m | Number of peers of a Bitcoin node (vertex degree). |
| $m_{min}$ | Minimum number of selected peers for relay. |
| $m_{max}$ | Maximum number of selected peers for relay. |
| m*(a) | Current number of selected peers for relay of transactions coming from interface a. |
| m** | Number of selected peers for relay of transactions at the originating node. |
| $\{C_a\}$ | List of peers' correlation coefficients of transactions coming from interface a. |
| $\{C^*_a\}$ | List of selected peers' correlation coefficients for relay of transactions coming from interface a. |
| $\overline{c_a}$ | Average value of $\{C_a\}$. |
| $c_{ab}$ | Correlation coefficient for interfaces a and b. |
| $t_a$ | Number of transactions received from interface a. |
| $t_{ab}$ | Number of duplicate transactions received from both interfaces a and b. |
| $T_{bootup}$ | Time required for a new node to build a stable correlation matrix. |
| $T_{change}$ | Time window between two consecutive local correlation matrix updates. |
| $T_{join}$ | Time window for dedicated relay to a new peer. |
| $T_{temp}$ | Time window for temporary relay to a peer. |
| β | Number of interfaces selected for soft update. |
| γ | Fraction of the number of incoming transactions relayed to a new peer. |

Malicious Nodes

A malicious nodes aims to make the probabilistic model for transaction dissemination less efficient. A malicious node can function or act in any of the following ways.

A malicious node does not propagate the transactions that are supposed to be propagated. Honest nodes connected to this malicious node may be able to retrieve these transactions from other honest (or malicious) peers. However, a complete dissemination of a transaction in the network is not required, assuming that a set of miners can still receive and include them in a new mined block.

A malicious node propagates the same legit transaction multiple times. The receiving node is able to keep track of the previously received transactions by means of a look-up table. Therefore, misbehaviour is easily detectable and malicious peers will be removed.

A malicious node propagates invalid transactions. If the receiving node performs transaction validation, misbehaviour is easily detectable and malicious peers will be removed.

A malicious node generates and propagates a huge number of dummy transactions. Receiver nodes can respond differently to a flood of valid incoming transactions from a peer. In response, (i) the receiver will ask the transmitter to reduce the transaction relay rate. If the problem persists, the transmitter peer will be removed, (ii) the receiver can ask (and check) for a minimum transaction fee on the relayed transactions. This makes the attack expensive for a malicious node. If the minimum transaction fee is not respected, the transmitter peer will be removed, and/or (iii) the transmitter peer is simply removed.

Based on the previously mentioned attacks and the probabilistic model, the following properties can be inferred.

Transaction relay rate depends on both bandwidth availability and processing performance of the individual nodes. For this reason, a default maximum rate is not enforced.

Malicious nodes cannot simply stay silent. They must forward valid transactions to keep their connections alive.

Messages

To support the implementation of the method herein, which encompasses a probabilistic relay of data or objects from node interfaces on the Bitcoin network, new message types can be introduced. Moreover, some of the current message types detailed above in relation to the current peer-to-peer Bitcoin protocol are no longer used, while those not mentioned below are unchanged with respect to the Bitcoin P2P protocol.

Data Messages

The message GETDATA to request one or more data objects from another node is no longer used, or removed from use. Similarly, message INV that transmit one or more inventories of objects known to the transmitting peer is no longer used, or removed from use. The NOTFOUND message as reply to GETDATA is no longer used, or removed from use.

The MEMPOOL message, already introduced above, requests the IDs of transactions that the receiving node has verified as valid but were not published in a block, i.e. transactions which are in the receiving node's memory pool. The response to this message is one or more INV messages containing the transaction IDs. A node sends as many INV messages as needed to reference its complete memory pool. A node may disable this feature, therefore transmission of its local MEMPOOL is not required.

Control Messages

PING and PONG messages to confirm that a peer is still connected are removed. Silent nodes, such as malicious nodes, are managed as described above. Message FEEFILTER is kept unchanged. However, peers who do not respect the fees threshold will be removed.

New messages TEMP and FLOW are introduced.

The TEMP message is used when a node is required to check if a peer is still alive because no incoming traffic was received from its interface. A temporary relay request TEMP (for an arbitrary small amount of time $T_{temp}$) is sent to the peer connected to said interface. If the receiving peer starts relaying but does not respect the given time window $T_{temp}$, it will be removed from the matrix.

The FLOW message is used when a node requires a peer to modify the transaction relay rate (e.g. number of transactions per second) according to the local flow control. The rate may increase, decrease or temporarily be suspended (relay rate=0). If the receiving peer does not respect the new relay rate, it will be removed. A new FLOW request will be required to modify the current relay rate. If the receiving peer does not receive a second FLOW request to resume the relay, it will remove the sender.

The MINFEE message is used when a node is required to receive transactions filtered by a minimum transaction fee. The minimum value can be set for individual transactions and/or total amount of fees in case of multiple transactions fit in a single IP packet. If the receiving peer does not respect the transaction fee limit, it will be removed.

Dimensioning

Figure 4:
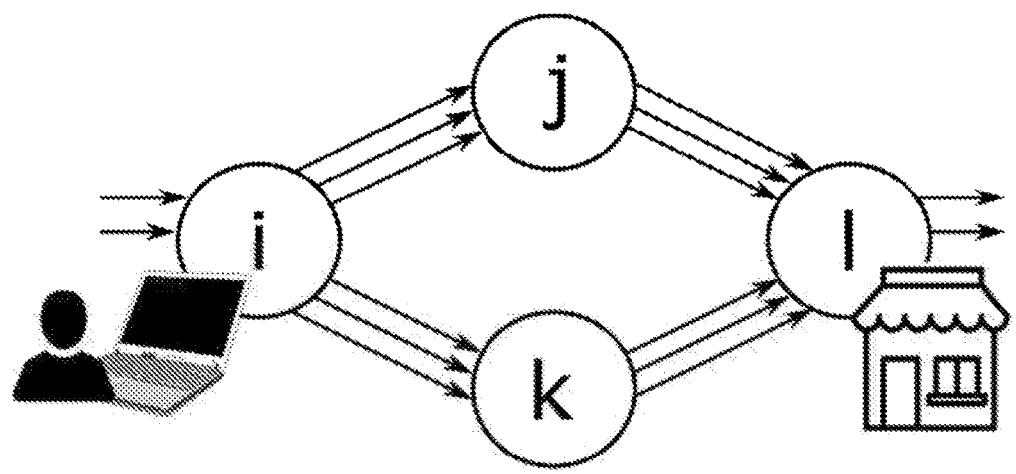
FIG. 4 is diagram representing nodes having different functions in a blockchain network.

FIG. 4 illustrates an element of a blockchain network having nodes i, j, k and l. Nodes can have different traffic profiles and can be categorised and referred to, by way of example, as:

"Providers", which are nodes that primarily generate transactions and node i may represent one or more merchant nodes with dedicated business activities "Aggregators", which are nodes that primarily collect transactions, and node I may represent one or more merchant nodes with dedicated business activities.

"Routers", which are nodes such as node j and node k that primarily route transactions.

Each node is able to automatically control the amount of in/out traffic depending on the current status of its connections and the bandwidth resources locally available. The allocation of bandwidth between input and output resources or interfaces can be adjusted according to the type or function of the node. Nodes i and j will be unbalanced, while node j and node k will be balanced because the same amount of data flowing in to a Router node will flow out of said node.

A node, for example Node j, has a plurality of interfaces connected to peer nodes. The node can determine its bandwidth (B) capacity based on a maximum amount of data (D) amount processable by the node over a time period (T). Some nodes have bandwidth caps imposed by their network providers.

$B_j$ is the application-level bandwidth available at node j. The bandwidth $B_j$ is an overall budget which depends on both (i) the quality of the network access provided by the Internet Service Provider (ISP) and (ii) the network usage by other local applications.

The value of $B_j$ depends on the different bandwidth requirements for the input $B_j^i$ and output traffic $B_j^o$. Therefore, $B_j = B_j^i + B_j^o$ For Routers it is assumed that $$\frac{B_j}{2} = B_j^i = B_j^o$$

For Aggregators it is assumed that $B_j^i = k_j B_j^o$ $k_j$ is a profile factor of the node and is determined, by way of example, from the type of node i.e. nominally set, or from the difference between the actual data passing in to and out of the node. Said profile factor $k_j$ is preferably determined from the ratio of incoming data to the node and data transmitted from the node, which can include relayed data and/or locally generated data.

Data ($d_j$) can monitored and established from the input data ($d_j^i$) and output data ($d_j^o$) passing through interfaces of the node j to and from peer nodes, and a profile factor ($k_j$) of the node j can be determined from the difference between the input data ($d_j^i$) to output data ($d_j^o$).

Data ($d_j$) can monitored over a plurality of time periods (T). The values of data monitored can be reset to zero when a new period T begins. Data generated within node j contributes to output data ($d_j^o$).

The time period (T) can be used to determine the maximum amount of data ($D_j$) processable by node j, such that $D_j = D_j^i + D_j^o$ wherein $D_j^i$ and $D_j^o$ are the maximum amount of incoming and outgoing data supported within the time period.

The time period T can be a flow control time window $T_{flow}$. Considering the variables at node j then, $$B_j = (k_j + 1)\frac{D_j^o}{T}$$

$$B_j^o = \frac{D_j^o}{T}$$

Therefore, $D_j^i$ and $D_j^o$ values are system parameters which depend on $k_j$, $T_{flow}$ and $B_j$.

$$D_j^o = \frac{B_j T}{(k_j + 1)}$$

$$D_j^i = k_j D_j^o = \frac{k_j B_j T}{(k_j + 1)}$$

Current Factors

For optimising the performance of a blockchain network Bitcoin is used by way of example. The specifications of the Bitcoin core allow up to 125 connections to different peers, 8 of which are outbound, by default. Therefore, it will be possible to have at most 117 inbound connections.

The number m of peers P connectable to a node is limited thus $m_{min}$ is 1 and $m_{max}$ is 125 for the current system. Without current restrictions, the number m of peers P connectable to a node is thus $m_{min} \geq 1$ and $m_{max} \leq P$.

The minimum number of peer nodes ($m_{min}$) and a maximum number of peer nodes ($m_{max}$) connectable to the node j can be set according to said monitored data (d) and the maximum number of peers (P) connectable to the node j.

Over two or more time periods (T) the monitored data (d) can be used to determine a ratio and set the minimum number of peer nodes ($m_{min}$) and a maximum number of peer nodes ($m_{max}$) connectable to the node j using said ratio. The ratio can be between actual data and the data limit. Other relationships, such as a non-linear relationship between data (d) to maximum data (D), can be used.

In addition to the relationship between the data (d) and data limit (D), the type or function of the node j can be factored in to the determination of the number of peer nodes that a node j can connect to. The function is taken in to account using a profile factor (k) that is assigned a value according to the function of the node. The profile factor can be variable.

By way of example, the profile factor value is one (1) for nodes configured to route data, greater than one (1) for nodes that collect or aggregate data, and less than one (1) for nodes that generate or provide data.

To mitigate fluctuations, or rogue data, averaged data (d*) comprising an average of data (d) over the plurality of time periods (T) can be used to determine the minimum and maximum number of peer nodes connectable to the node j by determining the ratio of averaged data (d*) to the maximum data (D).

Further still, a buffer can be factored in to the determination of the minimum number of peer nodes ($m_{min}$) and a maximum number of peer nodes ($m_{max}$) connectable to the node. Such a buffer can include using a standard deviation ($\sigma$) or variance ($\sigma^2$) of the data (d) over a plurality of time periods (T), applying a scaling factor to the variance, and determining the minimum and maximum number of peer nodes connectable to the node according to the scaled variance. The scaling factor can be a variance parameter t.

Monitored data ($d_j$) is a sum of the input data ($d_j^i$) and output data ($d_j^o$) passing through interfaces of the node j to and from peer nodes. It follows that the minimum and maximum number of peer nodes m connectable to a node j is set by:

$$m_{min} = \left\lceil \frac{d_j^*}{D_j^i + D_j^o} P - t\sigma_j^2 \right\rceil$$

$$m_{max} = \left\lceil \frac{d_j^*}{D_j^i + D_j^o} \cdot P + t\sigma_j^2 \right\rceil$$

wherein $m_{min}$ and $m_{max}$ are integer numbers of peer node connections $d_j^*$ is the averaged level of data (d) over a plurality of, $D_j^i$ and $D_j^o$ are the maximum amount of incoming and outgoing data supported within the time period (T), P is the maximum number of peers (P) connectable to the node, $\sigma^2$ is the variance of said data (d) for a given number of time periods (T), t is a scaling factor or variance parameter, and $m_{max} \leq P$ There can be a direct and proportional relationship between the linear range [1, P] and [$m_{min}$, $m_{max}$] values.

The number of time periods (T), or $T_{flow}$ time windows, considered for averaging $d_j$ and updating t can be constant. The variance parameter t can be a multiplicative factor.

By imposing $m_{min} \geq 1$ and $m_{max} \leq P$ in the previous equations then said equations can be rearranged to determine the range of values of the variance parameter t, which can be written as:

$$\frac{\frac{d_j^*}{D_j}P - 1}{\sigma_j^2} \leq t \leq = \frac{P\left(1 - \frac{d_j^*}{D_j}\right)}{\sigma_j^2}$$

During a node bootstrap, or initial set-up, $m_{min}=1$ and $m_{max}=P$.

The operational range of variables P, d* and $D_j$, is limited and, therefore, the operational range of t depending on $\sigma_j^2$ is limited. By way of example, given P=125 and $d_j^*/D_j=0.5$, then $$\frac{61.5}{\sigma_j^2} \leq t \leq = \frac{62.5}{\sigma_j^2}$$

The variance parameter can be determined using an approximation of the mean value of the range, representable by:

$$t \approx \frac{P-1}{2\sigma_j^2}$$

Once the $m_{min}$ and $m_{max}$ (integer numbers of peer node connections) are determined, the node can further determine a correlation matrix between the interfaces and peer nodes to which it is connected. The matrix is compiled with correlation coefficients representing the correlation between data processed at each interface of said node.

Time Windows (T)

The time period (T) is determined from the length of time between changes to the correlation matrix.

The node can additionally or alternatively receive information related to the activity of nodes on the blockchain network and set the time period (T) according to the length of time between a change to the correlation matrix and/or the change in activity level on the network.

The time window between two consecutive local correlation matrix updates can be used to determine T.

The time T can be determined, or at least influenced by, the average number of active nodes was 7561[1] (at June 2017), with an average increment of 0.85% each 24 hours. At these conditions, an initial value of T can be fixed at 60 mins considering that an average of 2.5 new nodes joins the network every hour. During normal relay operations of the node, T can be considered inversely proportional to the current cumulative amount of incoming data ($d_j^i$).

When a new peer node is connected then data can be relayed to said new peer for a dedicated period of time $T_{join}$. According to the state of the network this can be considered inversely proportional to the current cumulative amount of outgoing data $d_j^o$.

$T_{bootup}$ is the time required for a new node to build a stable correlation matrix, this value is proportional to a function $f(m)$, i.e., a higher number of connections requires a longer amount of time to build an accurate correlation matrix.

For the purpose of the invention, the time period T is the same as $T_{flow}$, which is the time window between two consecutive updates of the cumulative amount of incoming and outgoing data. This value can be proportional to $T_{change}$ and in the simplest case, $T_{flow}=T_{change}=T$.

In other words, the time period (T) can be a flow control parameter ($T_{flow}$), and said parameter is adjusted to modify the traffic passing through the node. The time period (T) can be adjusted by the node to a predetermined value temporarily. This can be based on local changes to the node that influence the bandwidth and, subsequently the data flow therethrough. In these circumstances an increased time period, such as a period twice the length of the preceding period i.e. 2T can be used for a limited period of time. Similarly, the period T can be set for an initiation period, wherein the node accumulates data. Either a local change or an initiation period can result in temporary relay of data to all peer nodes for a period of time.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

SUMMARY

Today's Bitcoin network is heavily centred around mining, in terms of computational effort. With vastly increased volumes of transactions this is not necessarily going to be feasible. The solution described in this specification leads to adjustment or dimensioning of the number of peer connections according to the data to be processed and bandwidth limits. While a probabilistic relay improves the handling and propagation of massive amount of transactions it does not take in to account the performance capabilities or bandwidth available at each node.

The invention can provide a method of dimensioning the number of connected peers and adjust the timing of actions taken by a node. Such timings include the reset or re-determination of the correlation matrix, boot-up time and the like.

Therefore, in addition to adjusting the connectivity according to the performance to optimise flow across the network by avoiding bottlenecks, the invention compliments the dissemination of data packets by optimising the communications between nodes.

Long queues caused by bottlenecks at nodes are inhibited by controlling the connectivity and, optionally, selectively relaying data packets according to the correlation between interfaces.

The overall number of peer connections is managed and can be complimented with a reduction in packet transmission while keeping a safe level of information redundancy.

REFERENCES

[1] Bitcoin transaction levels are made available via Blockchain Luxembourg S.A.R.L. and retrievable from http://blockchain.info.
[2] VISA transaction levels are summarised in a document published by Visa Inc. Visa Inc at Glance. June 2015. It is retrievable from http://usa.visa.com/dam/VCOM/download/corporate/media/visa-fact-sheet-Jun2015.pdf.
[3] Decker, Christian and Wattenhofer, Roger (2013). Information propagation in the bitcoin network. IEEE Thirteenth International Conference on Peer-to-Peer Computing (P2P), 2013.
[4] A Bitcoin Developer Reference is retrievable from http://bitcoin.org/en/developer-reference.

The invention claimed is:

1. A computer-implemented method for a node of a blockchain network, said node having a plurality of interfaces connected to peer nodes, the computer-implemented method comprising:
   determining a bandwidth (B) capacity of a node based on a maximum data (D) amount processable by the node over a time period (T);
   monitoring data (d), comprising input data ($d_i$) and output data ($d_o$), passing through interfaces of the node, to and from peer nodes, and determining a profile factor (k) of the node from the difference between the input data ($d_i$) to output data ($d_o$), wherein a correlation matrix is determined from correlation coefficients representing the correlation between data processed at each interface of said node, wherein said node receives information related to the activity of nodes on the blockchain network, and the time period (T) is determined from the length of time between a change to the correlation matrix;
   over a plurality of time periods (T) monitoring said data (d); and
   setting a minimum number of peer nodes ($m_{min}$) and a maximum number of peer nodes ($m_{max}$) connectable to the node according to said monitored data (d) and the maximum number of peers (P) connectable to the node.

2. A method according to claim 1, wherein over at least one time period (T) the monitored data (d) is used to determine a ratio and setting the minimum number of peer nodes ($m_{min}$) and a maximum number of peer nodes ($m_{max}$) connectable to the node is determined using said ratio.

3. A method according to claim 1, wherein the profile factor (k) is assigned a value according to a function of the node, wherein the profile factor has
   a value of one (1) for nodes configured to route data,
   a value greater than one (1) for nodes that collect or aggregate data, and
   a value less than one (1) for nodes that generate or provide data.

4. A method according to claim 1, wherein averaged data (d*) comprising an average of data (d) over the plurality of time periods (T), is used to determine the minimum and maximum number of peer nodes connectable to the node by determining the ratio of averaged data (d*) to the maximum data (D).

5. A method according to claim 4, further including determining a variance ($\sigma^2$) of the data (d) over a plurality of time periods (T), applying a scaling factor to the variance, and determining the minimum and maximum number of peer nodes connectable to the node according to the scaled variance.

6. A method according to claim 5, wherein $$m_{min} = \left[\frac{d^*}{D}P - t\sigma^2\right]$$

$$m_{max} = \left[\frac{d^*}{D} \cdot P + t\sigma^2\right]$$

wherein
d* is the averaged level of data (d) over the plurality of time periods (T),
D is the maximum data (D) processable by the node over a time period (T),
P is the maximum number of peers (P) connectable to the node,
$\sigma^2$ is the variance of said data (d),
t is a scaling factor or variance parameter, and
$m_{max} \leq P$.

7. A method according to claim 6, wherein the scaling factor or variance parameter t has an operational range, $$\frac{\frac{d_j^*}{D_j}P - 1}{\sigma_j^2} \leq t \leq \frac{P\left(1 - \frac{d_j^*}{D_j}\right)}{\sigma_j^2}$$

and the mean value of the variance parameter t across the operational range is used when determining the minimum and maximum number of peer nodes connectable to the node.

8. A method according to claim 1, wherein the time period (T) is adjusted by the node to a predetermined value temporarily to accommodate at least one of a local parameter update to the node, an initiation period, wherein the node accumulates data, and temporary relay of data to all peer nodes.

9. A method according to claim 1, wherein the time period (T) is a flow control parameter ($T_{flow}$), and said parameter is adjusted to modify the traffic passing through the node.

10. A method according to claim 1, wherein the node has a plurality of interfaces connected to peer nodes, said plurality being at least a minimum number of interfaces connected to a peer node ($m_{min}$) and less than or equal to a maximum number of interfaces connected to a peer node ($m_{max}$), the method further comprising:

determining a correlation matrix having correlation coefficients representing the correlation between data processed at each interface of said node;

receiving data at a receiving interface of said node; and selecting at least one of a plurality of other interfaces of said node, and relaying said received data from the or each other interface, wherein other interfaces are selected according to a set of the correlation coefficients of the receiving interface.

11. A method according to claim 10, wherein an indicator is derived from the correlation matrix and data is relayed if the correlation between the receiving interface and the or each other interface is lower than the indicator.

12. A non-transitory computer readable storage medium comprising computer-executable instructions which, when executed, configure a processor to perform the method of claim 1.

13. An electronic device comprising: an interface device; one or more processor(s) coupled to the interface device; a memory coupled to the one or more processor(s), the memory having stored thereon computer executable instructions which, when executed, configure the one or more processor(s) to perform the method of claim 1.

14. A node of a blockchain network, the node configured to perform the method of claim 1.

15. A blockchain network having a node according to claim 14.

* * * * *